July 21, 1925.
B. LJUNGSTRÖM
1,546,847
CONDENSER ADAPTED FOR LOCOMOTIVES AND SIMILAR VEHICLES
Filed Jan. 27, 1925
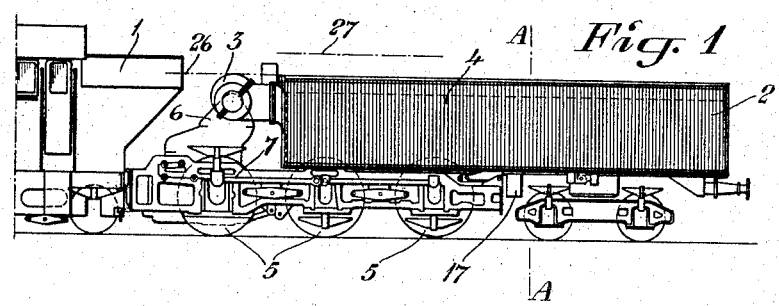
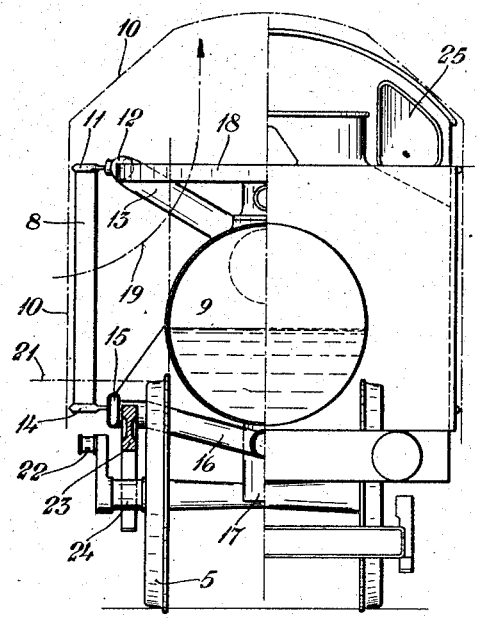
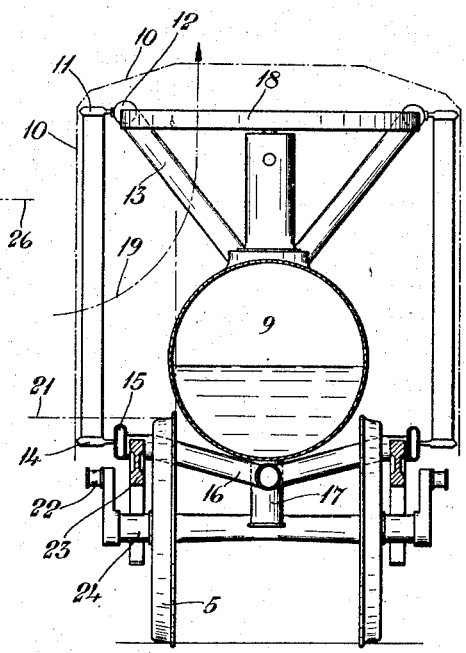
Inventor
B. Ljungström
By Marks & Clerk
Attys.

Patented July 21, 1925.

1,546,847

UNITED STATES PATENT OFFICE.

BIRGER LJUNGSTRÖM, OF STOCKHOLM, SWEDEN, ASSIGNOR TO AKTIEBOLAGET LJUNGSTROMS ANGTURBIN, OF LIDINGO-BREVIK, SWEDEN, A CORPORATION.

CONDENSER ADAPTED FOR LOCOMOTIVES AND SIMILAR VEHICLES.

Application filed January 27, 1925. Serial No. 5,136.

*To all whom it may concern:*

Be it known that I, BIRGER LJUNGSTRÖM, a subject of the King of Sweden, residing at Narvavagen 21, Stockholm, Sweden, have invented certain new and useful Improvements in Condensers Adapted for Locomotives and Similar Vehicles, of which the following is a specification.

In locomotives and similar vehicles, condensers are previously known which consist of condenser tubes or elements disposed in the roof of the locomotive or along the sides of the vehicle, through which tubes or elements an air current is forced by means of one or more fans. It is also known to combine with these elements a liquid container serving as a storer either for the steam to be condensed in the air-cooled elements, or for liquid or water respectively which has absorbed the heat of the exhaust steam in some way or other and is then caused to pass through the elements. The endeavours to make the condenser as short as possible, that is to say, to make its capacity per unit of length as great as possible, has led to a utilization as effective as possible of the space within the boundaries of the loading gauge, which has been rendered possible, by the propositions previously brought forth, by disposing the elements as closely as possible adjacent the boundaries of the loading gauge, either in the upper part of the vehicle or along the sides thereof. In the first instance the point of gravity of the condenser has been caused to be situated unsuitably high. By disposing the elements along the sides of the vehicle it has become possible to dispose the point of gravity lower down, it is true, and rather effectively to utilize the space within the loading gauge, counted in the lateral direction, but none of these propositions involves a final solution of the problem. There still remained certain portions of the loading gauge, particularly in its lower portions, that could not be utilized. Moreover, according to the laws of certain countries, there shall always be an unobstructed view rearwards over the condenser, from the driver's cab. This involves that the condenser must be built rather low, which causes further difficulties in solving the problem of attaining the requisite capacity per unit of length of the condenser, particularly so if the condenser elements are disposed along the sides of the vehicle, which construction has, for many reasons, proved to be the most suitable. These difficulties are present both in locomotives comprising a single vehicle, and in locomotives consisting of two separate vehicles, one for the boiler and another for the condenser.

The present invention has for its purpose to obviate these difficulties, and relates to an arrangement in condensers adapted for locomotives or similar vehicles, which condensers consist of condenser tubes or elements disposed along the sides of the vehicle, and the invention consists in that the tubes or elements extend downwardly outside the wheels and underneath the highest points of the wheels.

The invention is disclosed in the accompanying drawings. Fig. 1 is an elevation of a locomotive provided with a condenser according to the invention. Fig. 2 shows in its left portion a section on the line A—A in Fig. 1, and in its right portion an endwise view of the same locomotive. Fig. 3 shows a section of a somewhat modified embodiment.

According to Figs. 1 and 2, the locomotive consists of two vehicles 1 and 2, of which the one vehicle 1 carries the boiler and the driver's cab of the locomotive, while the other vehicle 2 carries the condenser 4 and the driving means 3 of the locomotive, such driving means consisting in the embodiment shown of a turbine. The motion is transmitted from the turbine 3 onto the driving wheels 5 through a toothed gearing disposed in the casing 6, and through the coupling rod device 7.

As will be seen from the left hand portion of Fig. 2, the condenser 4 comprises condenser tubes or elements 8 disposed along the sides of the vehicle, and of a liquid container 9 co-operating with said tubes or elements. The elements 8 are disposed as closely as possible adjacent the bounding line 10 of the loading gauge. The upper ends of the elements are connected, through the medium of collecting chambers 11, with a common steam distributing pipe 12 communicating through the pipes 13 with the upper portion of the liquid container 9, and their lower ends are in a like manner connected, through collecting chambers 14, to a collecting pipe 15 extending in the longitudinal direction of the vehicle, said collecting pipe 15 communicating through pipes 16 with a collecting well 17 arranged underneath the container, from which well the water is pumped into the container 9 in known manner. The air required for the cooling is sucked by means of fans 18, in the direction of the arrow 19, through the elements 8 in a direction substantially from below and obliquely upwards.

According to the invention, the condenser tubes or elements 8 extend downwards outside the wheels 5 and underneath the highest points thereof, that is to say, underneath the line 21, so far downwards as is permitted by the crank pins 22 of the driving axle. Thus it has become possible to utilize the space within the lower portion of the loading gauge more effectively than was hitherto the case, in that the space immediately above the connecting rod device, which previously could not be utilized, has now been made serviceable.

It will also be seen from the figure that the driving wheels 5 are disposed inside the frame 23 of the vehicle and that the crank pins 22 are arranged outside the bearings 24 of the wheels. The pipes 16 are, obviously, arranged between the driving wheels 5 where also the frame 23 is lower.

The embodiment shown in Figs. 1 and 2 is constructed to fulfil the condition that an unobstructed view shall be had rearwards from the driver's cab over the condenser. As will be seen from the right hand portion of Fig. 2, this is rendered possible for the reason that the condenser has been disposed at so low a level that the driver will, for instance in driving backwards, have an unobstructed view of the track, over the condenser, through a window 25 in the driver's cab, the greatest height of the condenser being indicated by the line 26.

The modification of the condenser shown in Fig. 3 does not fulfil this condition, which in many cases is not required, either. As will be found from the drawing, the elements 8 are elongated upwards, so that the height of the condenser corresponds to the line 27 in Fig. 1. This construction is particularly suitable in cases where the upper portion of the loading gauge is wide. With this embodiment the advantage is attained, as compared with the one shown in Figs. 1 and 2, that the capacity of the condenser will be larger per unit of length for the reason that the condenser elements are considerably longer. As in the previous case, the elements 8 extend downwardly outside the wheels 5 and underneath the highest points of the wheels as far as the crank pins 22 will permit, said points being, as before, indicated by the line 21.

While the locomotive above described consists of two vehicles, i. e. one boiler vehicle and another condenser vehicle, the invention may evidently also be applied in locomotives comprising a single vehicle. Neither is the invention limited to a certain special form of the container 9, nor to any certain definite embodiment of the arrangements through which the condenser tubes or elements are supplied with steam or water respectively.

What I claim as new and desire to secure by Letters Patent of the United States of America is:—

1. An arrangement in condensers adapted for locomotives and similar vehicles, such condensers consisting of condenser tubes or elements disposed along the sides of the vehicle and transversely thereof, the lower ends of the said tubes or elements being connected with collecting pipes extending in the longitudinal direction of the condenser, characterized by these collecting pipes being disposed outside the plane of the driving wheels and below their highest points, and by the same being connected with the collecting place for water of condensation by means of pipes.

2. An arrangement as claimed in claim 1, wherein the condenser is disposed on the same vehicle as a driving means pertaining to the vehicle, from which driving means the motion is transmitted to the driving wheels by crank pins and coupling rods, characterized by the lower portions of the elements being situated above and immediately adjacent the crank pins.

In testimony whereof I affix my signature in presence of two witnesses.

BIRGER LJUNGSTRÖM.

Witnesses:
S. LINDRATH,
L. BERGULINDE.